March 5, 1968

SEIZO OKAMURA ET AL 3,372,145

PROCEDURE FOR CONTINUOUS MANUFACTURE OF
POLYOXYMETHYLENE OF ULTRA-HIGH DEGREE
OF POLYMERIZATION

Filed Jan. 7, 1964

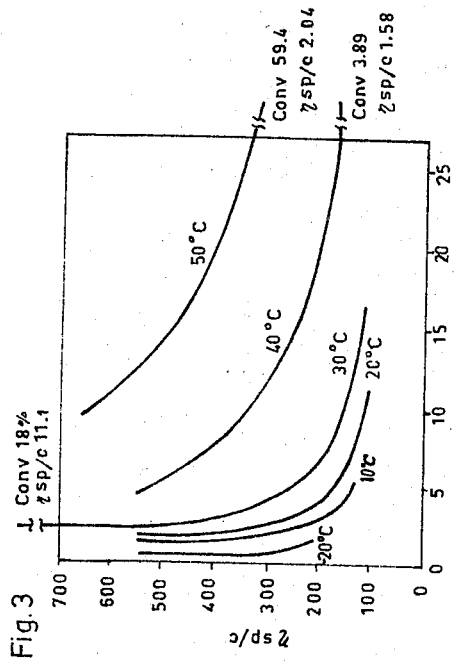

Fig. 3

Effect of Polymerization Temperature on Reduced-Viscosity of Resulting Polymer in Catalytic Solid-Phase Polymerization. (Measured on the polymer obtained in Figure 2)

Yield of Polymerization

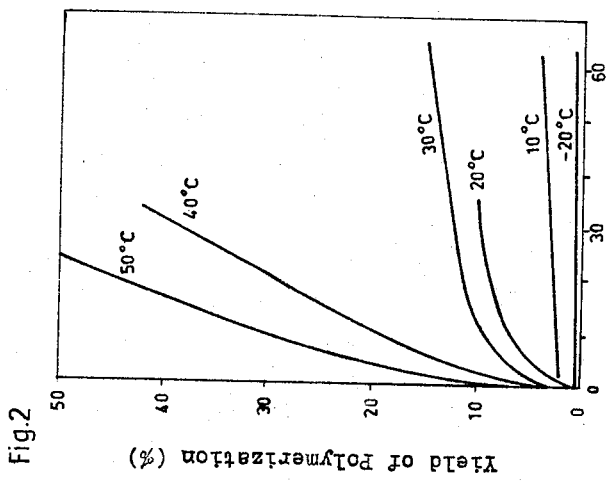

Fig. 2

Effect of Polymerization Temperature on Catalytic Solid-Phase Polymerization.

Concentration of Monomer: 0.74 mol/l
Concentration of catalyst: 11.25 m mol/l
Catalyst Used: $BF_3O(C_2H_5)_2$
Solvent Used: n-hexane INVENTORS
Seigo Okamura
Toshinobu Higashimura By Stevens, Davis, Miller & Mosher
Attorneys United States Patent Office 3,372,145
Patented Mar. 5, 1968

3,372,145
PROCEDURE FOR CONTINUOUS MANUFACTURE OF POLYOXYMETHYLENE OF ULTRA-HIGH DEGREE OF POLYMERIZATION
Seizo Okamura and Toshinobu Higashimura, Sakyo-ku, Kyoto, Japan, assignors to Research Institute for Production Development, Sakyo-ku, Kyoto, Japan, a non-profit-making organization of Japan
Filed Jan. 7, 1964, Ser. No. 336,288
Claims priority, application Japan, Jan. 14, 1963, 38/1,859
6 Claims. (Cl. 260—67)

ABSTRACT OF THE DISCLOSURE

A process for the manufacture of ultra-high molecular weight polyoxymethylene including the steps of (1) polymerizing trioxane crystals suspended in an organic liquid containing a dissolved polymerization catalyst for less than about 5 minutes at a temperature between −20° C. and 60° C., (2) separating the catalyst solution from the solid monomer and polymer, (3) deactivating the polymerization after a conversion of about 10–20% by weight of the monomer, and (4) separating athe monomer from the polymer.

---

Figure 1:
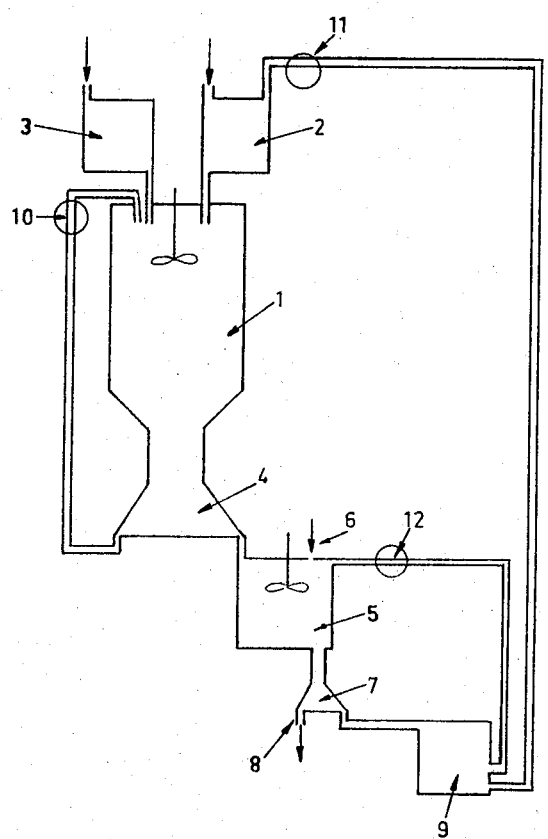

The present invention relates to a procedure for continuous manufacture of polyoxymethylene of ultra-high degree of polymerization comprising of the following steps—namely: inert liquid containing catalyst and microcrystalline trioxane are supplied from the top of polymerization tower so that trioxane monomer is rapidly polymerized in the polymerization tower in solid phase, then from the bottom of the tower is taken out microcrystals composed of unreacted trioxane and trioxane polymer under such extent that the conversion of polymerization is not so great, and monomer is removed therefrom by dissolving or sublimating in separatory chamber.

The liquid phase polymerization of trioxane wherein trioxane is polymerized in liquid or fused state using catalyst has already been widely known. In such a method, however, there are some problems that a polymer of extremely high degree of polymerization can hardly be obtained and that continuous polymerization is difficult since the polymer is precipitated in the reaction system during the polymerization process.

The present inventors have carried out various investigations on polymerization of trioxane and found that polymer of high degree of polymerization can very rapidly be obtained by suspending crystals of trioxane monomer in a catalyst-containing liquid which is a poor solvent for the monomer; such a technical idea was already filed (Japanese patent application No. 26,633/1962—U.S. patent application No. 290,174/1963). Subsequent to this invention, further studies have been made and the following novel fact was clarified. Namely, the solid-phase polymerization gives polymer of very high degree of polymerization at an initial stage of polymerization and the velocity of polymerization is high. While polymer having a reduced viscosity (in p-chlorophenol; at 60° C.) of 2.0 at best is obtained in the conventional liquid-phase polymerization, such polymers as having a reduced viscosity of 10.0 may, for example, can easily be obtained in the present invention procedure. In addition, the higher the polymerization temperature, the higher the degree of polymerization of the resulting polymer and the less decrease in the degree of polymerization following the polymerization. Therefore, if the reaction is carried out at comparatively high temperature which is lower than the melting point of trioxane monomer, polymer of high degree of polymerization can easily be obtained. The results of polymerization velocity and degree of polymerization of the resulting polymer are given in the attached drawings. Since the present reaction has quite high velocity of polymerization, it is effective to stop the polymerization within 1 to some 5 minutes in order to obtain polymer of high degree of polymerization. Reaction of about 1 minute is the most suitable.

The object of the present invention is to give polymer of ultra-high degree of polymerization (e.g. having a reduced viscosity greater than 5) continuously and easily by full utilization of the above merits. Namely, from the top of the polymerization tower are supplied a solution containing catalyst and crystals of trioxane monomer, and in the polymerization tower the polymerization is carried out in solid crystalline state, and the resulting polymer is isolated so that continuous polymerization takes place.

In the present invention, the inner temperature of polymerization tower is to be lower than the melting point of trioxane monomer and it is desired to control the reaction time of the monomer so that the degree of polymerization is not substantially lowered as the reaction goes on. The reaction may proceed between −20° C. to +60° C., and preferably between +30° C. to 60° C.

In order to obtain polymer of ultra-high degree of polymerization, it is desired to stop the polymerization within 10 to 20% conversion in the above temperature range, the polymerization is preferably stopped within such short period as less than some 5 minutes.

In general, such aliphatic hydrocarbon as n-hexane and the like is preferably used as the reaction medium which is a poor solvent for the monomer in the present invention. The mixing ratio of total liquid and trioxane monomer may, as already described, be adequately selected according to the polymerization temperature, etc. and it is suitable that the ratio is 5 to 20 parts per 100 parts by weight of solvent. It is not necessary to use completely anhydrous trioxane and it is sufficient to use trioxane containing less than $\frac{1}{10}\%$ of water. Since the reaction starts with the surface of the solid, it is desired to use trioxane monomer crystals of not so large size.

Polymerization catalysts which can be used include such Friedel-Crafts catalyst as $SnCl_4$, $BF_3$, etc. or complex compound thereof such as $SnCl_4$-trichloroacetic acid, $BF_3 \cdot O(C_2H_5)_2$, etc. The concentration of the catalyst in the polymerization tower may be 1 to 10 parts per 100 parts by weight of monomer and 2 to 4 is most suitable. The isolated catalyst solution may be recovered and be used again.

It is necessary in the present invention to stop the polymerization rapidly. Accordingly, the selection of polymerization deactivating agent for the reaction may be important and such agents as alcohol (methanol is especially preferred) containing ammonia or amine, water steam, ammonia gas, etc. may be used. When alcohols are used as polymerization deactivating agent, unreacted trioxane is dissolved in alcohol and, therefore, the solution is cooled or concentrated so that trioxane is recovered. In case ammonia gas, water steam, etc. are used, trioxane may be recovered by sublimation. By introducing trioxane recovered by such means to the polymerization tower, the continuous polymerization can be carried out.

The attached drawing illustrates the apparatus suitable for carrying out the present invention. FIGURE 1 illustrates an example of the apparatus which is suitable for carrying out the process of this invention. FIGURES 2 and 3 illustrate, respectively, the effect of polymerization temperature on catalytic, solid-phase polymerization, and the effect of polymerization temperature on the inherent viscosity of the resulting polymer in catalytic solid-phase polymerization.

In the drawing, 1 is polymerization tower, 2 is a gauge hopper for the monomer equipped on the top of the polymerization tower 1, 3 is a gauge hopper of catalyst solution, 4 is the separatory chamber attached to the bottom of the polymerization tower 1 for separating solids from liquid, 5 is polymerization deactivation chamber, 6 is a gauge hopper of the reaction stopping agent, 7 is the separatory chamber for the resulting polymer, 8 is an exit of the product, 9 is a purification chamber of unreacted trioxane, 10 is a circulating pump for the catalyst solution, 11 is a feed pump of the recovered monomer, and 12 is the feed pump of the polymerization deactivating agent.

The operation of the process of the present invention is fully explained with the drawing as follows: Trioxane monomer crystals and catalyst solution at the desired temperature are supplied from the hoppers 2 and 3 and they are passed through the polymerization tower 1 in short period so that the polymerization reaction proceeds. The reaction substance is rapidly separated into catalyst solution and solid composed of unreacted monomer crystals and polymer by centrifugation, etc. in the separatory chamber 4 at the bottom of the polymerization tower. The catalyst solution is repeatedly introduced into the polymerization tower by the pump 10 and, if necessary, it may be supplied from the gauge hopper 3 of the catalyst solution, too. The solid is treated with the polymerization deactivating agent in chamber 5 so that the reaction is stopped. When the monomer is dissolved in methanol and separated in the separatory chamber 7, polymer may be separated by centrifugation, etc. and when the polymerization is deactivated with ammonia gas, etc., the monomer is recovered by sublimation. By removal of monomer by solubilization or sublimation, the resulting polymer is obtained from the exit of 8. Unreacted monomer is recovered and separated in the purification chamber 9 and is again introduced into the polymerization tower by the feed pump 11. The recovered deactivation agent is again introduced into the deactivation chamber by the feed pump 12 and, if necessary, it is supplied from the gauge hopper 6.

The present invention is explained in the examples:

*Example I*

Using the apparatus as given in the attached drawing, trioxane monomer is introduced into the polymerization tower kept at $+50°$ C. at the speed of 100 g./min. In the polymerization tower, 1.5 liters of n-hexane solution containing 2.2 g. of $BF_3.O(C_2H_5)_2$ is rapidly circulated at $+50°$ C., and the monomer is sent to the deactivation chamber after 1 minute. The monomer which is transparent at an initial stage becomes non-transparent on its surface. When it is mixed with 500 ml. (to 100 g. of solid) of methanol containing 3% ammonia at $+40°$ C., the monomer is dissolved in methanol and the polymer left undissolved so that they can be separated by centrifugation.

In every 1 minute, 11.2 g. of polymer is obtained from 100 g. of monomer. When methanol containing unreacted monomer is cooled at $-20°$ C., 70 g. of monomer can be recovered. The residual methanol is again recovered and is used once more. The reduced viscosity of the resulting polyoxymethylene is measured in p-chlorophenol (at $+60°$ C.) containing 2% of alpha-pinene and found to be 7.2; the melting point is 179° C.

What is claimed is:

1. A process for the manufacture of polyoxymethylene of a high degree of polymerization which comprises the steps of (1) passing through a polymerization zone at a temperature of $-20°$ to 60° C. a slurry of trioxane crystals suspended in an organic liquid containing a dissolved polymerization catalyst for a period of time not longer than about five minutes, (2) separating the unused catalyst solution from the solid monomer and polymer in the reaction product leaving said polymerization zone, (3) deactivating the polymerization reaction when a conversion of 10–20% by weight of the monomer has been reached, and (4) separating the remaining monomer from the polymer.

2. The process of claim 1 in which said organic liquid is an aliphatic hydrocarbon.

3. The process of claim 1 in which the polymerization reaction is deactivated by treating the polymerizing trioxane with a reagent from the group consisting of a solution of ammonia in an alcohol, a solution of an amine in an alcohol, steam, and ammonia gas.

4. The process of claim 1 in which the polymerization zone is at a temperature of 30° C. to 60° C.

5. The process of claim 1 in which trioxane crystals and the organic liquid containing a dissolved polymerization catalyst are continuously added to the polymerization zone, and said unpolymerized monomer and said catalyst solution are continuously recycled whereby ultra-high molecular weight polyoxymethylene is continuously produced.

6. In a process for manufacturing polyoxymethylene from trioxane crystals suspended in an organic liquid containing a dissolved polymerization catalyst at a temperature of $-20°$ to 60° C., the improvements comprising terminating the polymerization after a period of time of not more than about five minutes and adding a deactivating agent after about 10–20% conversion by weight of the monomer.

References Cited

UNITED STATES PATENTS 2,989,509  6/1961  Hudgin et al. -------- 260—67
2,989,510  6/1961  Bruni ---------------- 260—67

OTHER REFERENCES

Kern et al.: Journal of Polymer Science, vol. 48, No. 150, pp. 399–404 (December 1960).

Okamura et al.: Journal Chem. Soc. Japan, Ind. Chem. Sec., vol. 65, No. 5, pp. 712–716 (1962).

WILLIAM H. SHORT, *Primary Examiner.*

L. M. PHYNES, *Assistant Examiner.*